(12) United States Patent
Wada

(10) Patent No.: US 7,011,413 B2
(45) Date of Patent: Mar. 14, 2006

(54) IMAGE PROCESSING SYSTEM, PROJECTOR, PROGRAM, INFORMATION STORAGE MEDIUM, AND IMAGE PROCESSING METHOD

(75) Inventor: Osamu Wada, Ina (JP)

(73) Assignee: Seiko Epson Corporation, Tokyo (JP)

( * ) Notice: Subject to any disclaimer, the term of this patent is extended or adjusted under 35 U.S.C. 154(b) by 140 days.

(21) Appl. No.: 10/429,049

(22) Filed: May 5, 2003

(65) Prior Publication Data

US 2004/0001185 A1 Jan. 1, 2004

(30) Foreign Application Priority Data

May 9, 2002 (JP) .................................. 2002-133984

(51) Int. Cl.
*G03B 21/00* (2006.01)
*G09G 5/02* (2006.01)
*G06K 9/00* (2006.01)
*H04N 5/57* (2006.01)

(52) U.S. Cl. .................... 353/31; 353/122; 345/589; 382/162; 348/602

(58) Field of Classification Search ............... 353/30, 353/31, 122; 345/591, 589, 431, 114, 145, 345/426
See application file for complete search history.

(56) References Cited

U.S. PATENT DOCUMENTS

| 6,118,455 A | * | 9/2000 | Hidaka et al. .............. 345/589 |
| 2002/0051001 A1 | | 5/2002 | Kanai .......................... 345/91 |
| 2003/0179211 A1 | * | 9/2003 | Wada et al. ................ 345/589 |
| 2003/0234785 A1 | * | 12/2003 | Matsuda et al. ........... 345/426 |
| 2004/0021672 A1 | * | 2/2004 | Wada .......................... 345/591 |

FOREIGN PATENT DOCUMENTS

| EP | 1 178 680 A2 | 2/2002 |
| EP | 1 189 434 A2 | 3/2002 |
| JP | A 8-65701 | 3/1996 |
| JP | A 9-37091 | 2/1997 |
| JP | 11-75072 | 3/1999 |
| JP | A 11-234539 | 8/1999 |
| JP | 2002-95021 | 3/2002 |
| JP | 2002-094791 | 3/2002 |

* cited by examiner

*Primary Examiner*—Judy Nguyen
*Assistant Examiner*—Melissa J Koval
(74) *Attorney, Agent, or Firm*—Oliff & Berridge, PLC (57) ABSTRACT

An image processing system that shorten calibration time includes a storage section which stores darkroom-condition-measurement data obtained by measuring a display region on which a plurality of calibration images having different colors are displayed under a darkroom condition through a sensor; a measurement data generating section which generates supposed measurement data based on a viewing-environment-measurement data obtained by measuring one of the plurality of calibration images through the sensor under a viewing environment and the darkroom-condition-measurement data; a color gamut computing section which computes an area ratio between a color gamut based on the darkroom-condition-measurement data and a color gamut based on the supposed measurement data; and a correcting section which corrects an image correcting data to correct a hue and gray scale of an image using a logistic function with a parameter based on the area ratio and also corrects image information for displaying an image.

14 Claims, 8 Drawing Sheets

| COLOR TYPE \ FILTER TYPE | B | G | R |
|---|---|---|---|
| AMBIENT LIGHT | 0 | 0 | 0 |
| K | 10 | 20 | 5 |
| R | 10 | 20 | 260 |
| G | 10 | 275 | 5 |
| B | 265 | 20 | 5 |
| W | 265 | 275 | 260 |

FIG. 4B

| COLOR TYPE \ FILTER TYPE | B | G | R |
|---|---|---|---|
| AMBIENT LIGHT | 20 | 15 | 30 |
| K | 30 | 35 | 35 |
| R | 30 | 35 | 290 |
| G | 30 | 290 | 35 |
| B | 285 | 35 | 35 |
| W | 285 | 290 | 290 |

IMAGE PROCESSING SYSTEM, PROJECTOR, PROGRAM, INFORMATION STORAGE MEDIUM, AND IMAGE PROCESSING METHOD

Japanese patent application No. 2002-133984 filed on May 9, 2002 is hereby incorporated by reference in its entirety.

BACKGROUND OF THE INVENTION

The present invention relates to an image processing system, projector, program, information storage medium and image processing method which can correct image information in consideration of the difference between a darkroom condition and a viewing environment.

When an image is subjected to the effect of an ambient light (illuminating light or sunlight), the color and/or brightness thereof may be varied. Thus, the image appearance may be different from the intention of a person who has produced it.

In order to adjust such an image appearance, a projector has been designed to display an image by displaying each of single-colored (e.g., black-, red-, blue- and white-colored) calibration images for a predetermined gray scale (e.g., 16-level gray scale), measuring each of the displayed calibration images, correcting a lookup table or the like based on the measured data and using the corrected lookup table to correct the image information (e.g., R-, G- and B-signals) used to display the image.

For example, Japanese Patent Application Laid-Open No. 9-37091 discloses a system which measures the color of an illuminating light and R-, G- and B-colors while stepwise changing the light-emitting level, as shown in FIG. 3 thereof.

In such a manner, the prior art must perform the calibration by repeatedly carrying out the display and measurement for each of a number of calibration images, requiring vast amount of time for calibration.

For such a reason, time is required to initiate the calibration, for example, when a presenter is to make a presentation before the customer to which he went. The time to be primarily applied to the presentation may be reduced.

BRIEF SUMMARY OF THE INVENTION

In view of the above-mentioned problem, the present invention may provide an image processing system, projector, program, information storage medium and image processing method which can reduce time required to perform a calibration for adjusting the image appearance.

To this end, according to the first aspect of the present invention, there is provided an image processing system comprising:

a storage section which stores darkroom-condition-measurement data obtained by measuring a display region on which a plurality of calibration images are sequentially displayed under a darkroom condition, each of the plurality of calibration images having a different color, the display region being measured for each of the plurality of calibration images through a sensor;

a supposed measurement data generating section which generates supposed measurement data based on viewing-environment-measurement data and the darkroom-condition-measurement data, the viewing-environment-measurement data being obtained by measuring the display region on which one of the plurality of calibration images is displayed under a viewing environment through the sensor; and a correcting section which corrects predetermined image correcting data by grasping a difference between the darkroom condition and the viewing environment based on the darkroom-condition-measurement data and the supposed measurement data, and also corrects image information used for image display based on the corrected image correcting data.

According to the second aspect of the present invention, there is provided a projector comprising:

a storage section which stores darkroom-condition-measurement data obtained by measuring a display region on which a plurality of calibration images are sequentially displayed under a darkroom condition, each of the plurality of calibration images having a different color, the display region being measured for each of the plurality of calibration images through a sensor;

a supposed measurement data generating section which generates supposed measurement data based on viewing environment-measurement data and the darkroom-condition-measurement data, the viewing-environment-measurement data being obtained by measuring the display region on which one of the plurality of calibration images is displayed under a viewing environment through the sensor;

a correcting section which corrects predetermined image correcting data by grasping a difference between the darkroom condition and the viewing environment based on the darkroom-condition-measurement data and the supposed measurement data, and also corrects image information used for image display based on the corrected image correcting data; and an image projecting section which projects an image based on the corrected image information.

According to the third aspect of the present invention, there is provided a computer-readable program for causing a computer to function as:

storage means for storing darkroom-condition-measurement data obtained by measuring a display region on which a plurality of calibration images are sequentially displayed under a darkroom condition, each of the plurality of calibration images having a different color, the display region being measured for each of the plurality of calibration images through a sensor;

supposed measurement data generating means for generating supposed measurement data based on viewing-environment-measurement data and the darkroom-condition-measurement data, the viewing-environment-measurement data being obtained by measuring the display region on which one of the plurality of calibration images is displayed under a viewing environment through the sensor; and correcting means for correcting predetermined image correcting data by grasping a difference between the darkroom condition and the viewing environment based on the darkroom-condition-measurement data and the supposed measurement data, and also corrects image information used for image display based on the corrected image correcting data.

According to the fourth aspect of the present invention, there is provided an information storage medium storing a computer-readable program for causing a computer to function as:

storage means for storing darkroom-condition-measurement data obtained by measuring a display region on which a plurality of calibration images are sequentially displayed under a darkroom condition, each of the plurality of calibration images having a different color, the display region being measured for each of the plurality of calibration images through a sensor;

supposed measurement data generating means for generating supposed measurement data based on viewing-environment-measurement data and the darkroom-condition-measurement data, the viewing-environment-measurement data being obtained by measuring the display region on which one of the plurality of calibration images is displayed under a viewing environment through the sensor; and correcting means for correcting predetermined image correcting data by grasping a difference between the darkroom condition and the viewing environment based on the darkroom-condition-measurement data and the supposed measurement data, and also corrects image information used for image display based on the corrected image correcting data.

According to the fifth aspect of the present invention, there is provided an image processing method comprising steps of:

displaying a plurality of calibration images under a darkroom condition, each of the plurality of calibration images having a different color;

measuring each of the plurality of calibration images through a sensor, the plurality of calibration images being sequentially displayed;

generating darkroom-condition-measurement data based on the measuring of each of the plurality of calibration images;

displaying one of the plurality of calibration images under a viewing environment;

measuring the displayed one of the plurality of calibration images through the sensor;

generating viewing-environment-measurement data based on the measuring of the displayed one of the plurality of calibration images;

generating supposed measurement data based on the viewing-environment-measurement data and the darkroom-condition-measurement data;

correcting a predetermined image correcting data by grasping a difference between the darkroom condition and the viewing environment based on the darkroom-condition-measurement data and the supposed measurement data;

correcting image information based on the corrected image correcting data; and displaying an image based on the corrected image information.

In accordance with these aspects of the present invention, the image processing system and the like can perform calibration by displaying and measuring one of the calibration images under the viewing environment and generating the supposed measurement data.

Thus, the image processing system and the like can shorten the calibration time since there is no need to display and measure various types of calibration images under the viewing environment, unlike the conventional art.

The image processing system and the projector may further comprise a color gamut computing section which computes an area ratio between a color gamut based on the darkroom-condition-measurement data and a color gamut based on the supposed measurement data, and the correcting section may correct the image correcting data to correct a hue and gray scale of an image using a logistic function with a parameter based on the area ratio, and may also correct the image information based on the corrected image correcting data.

The program and the information storage medium may cause a computer to function as:

color gamut computing means for computing an area ratio between a color gamut based on the darkroom-condition-measurement data and a color gamut based on the supposed measurement data, and the correcting means may correct the image correcting data to correct a hue and gray scale of an image using a logistic function with a parameter based on the area ratio, and may also correct the image information based on the corrected image correcting data.

In the image processing method, when the image correcting data is corrected, an area ratio between a color gamut based on the darkroom-condition-measurement data and a color gamut based on the supposed measurement data may be computed, and the image correcting data may be corrected to correct a hue and gray scale of an image using a logistic function with a parameter based on the area ratio.

With this configuration, the image processing system and the like can shorten the entire calibration time since the hue and gray scale of the image can be corrected by performing displaying and measuring at least one of the calibration images.

Since logistic function is broadly used to estimate the image quality as a function for determining the relationship between the estimation scale by a user and the physical quantity, the image processing system and the like can display an image which more properly reflects the human sense of brightness by performing the correction using the logistic function.

In the image processing system, the projector, the program, the information storage medium, and the image processing method, the supposed measurement data may be obtained by supposing a measurement value expected to be obtained in a case of measuring the display region on which another of the plurality of calibration images is displayed under the viewing environment through the sensor.

In the image processing system and the projector, the supposed measurement data generating section may generate the supposed measurement data based on viewing-environment-measurement data obtained by measuring calibration images through the sensor, each of the calibration images having a different color, the calibration images being smaller in number than the plurality of calibration images.

In the program and the information storage medium, the supposed measurement data generating means may generate the supposed measurement data based on viewing-environment-measurement data obtained by measuring calibration images through the sensor, each of the calibration images having a different color, the calibration images being smaller in number than the plurality of calibration images.

The image processing method may further comprise steps of:

displaying calibration images under the viewing environment, each of the calibration images having a different color, the calibration images being smaller in number than the plurality of calibration images;

measuring the calibration images through the sensor; and generating the viewing-environment-measurement data based on the measuring of the calibration images.

Thus, the image processing system and the like can perform calibration by displaying and measuring the calibration images smaller in number than those of the conventional art under the viewing environment to generate the supposed measurement data.

As a result, the image processing system and the like can shorten the calibration time in comparison with the conventional art.

The sensor may include an RGB sensor, a luminous efficacy sensor or the like, for example.

DETAILED DESCRIPTION OF THE EMBODIMENT

Figure 1:
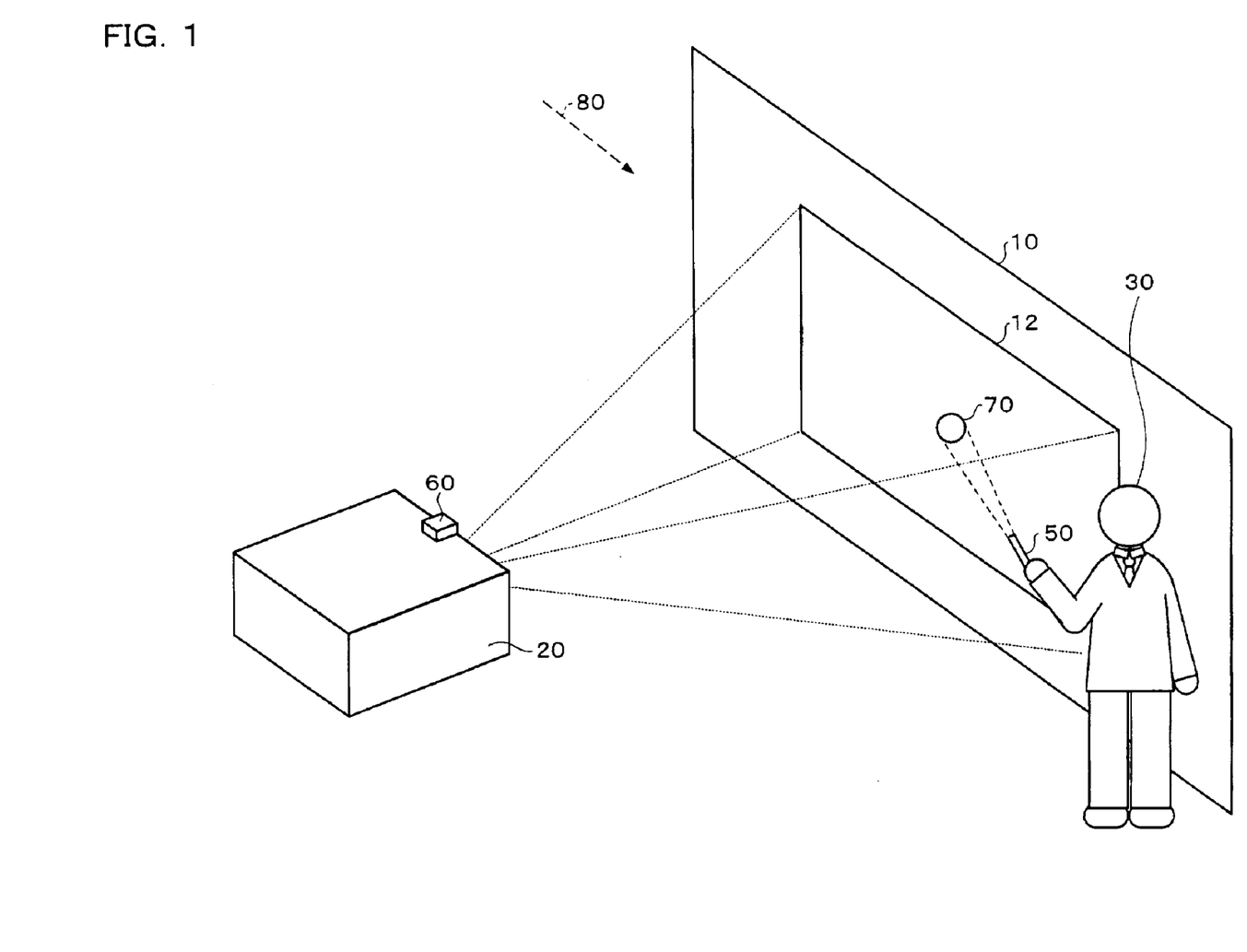
FIG. 1 is a schematic illustration of a projector according to one example of an embodiment of the present invention.

The present invention will now be described in connection with an image processing system using a liquid crystal projector with reference to the drawing. An embodiment shown in the following is not intended to limit the subject matter of the invention as described in the accompanying claims. Moreover, all the components shown in such an embodiment is not necessarily essential for practicing the invention defined by the accompanying claims.
Entire System FIG. 1 is a schematic illustration of a projector according to one example of this embodiment. The projector 20, which is a kind of projection type display section placed substantially in the front of a screen 10, projects a presentation image. A presenter 30 performs a presentation to the third person(s) while pointing a desired location on an image in an image display region 12 which is a display region on the screen 10, using a spot light 70 projected from a laser pointer 50.

When such a presentation is performed, the image appearance in the image display region 12 will greatly be varied depending on the type of the screen 10 and the ambient light 80. For example, the same white color projected from the projector 20 may look yellowish or bluish white color, depending on the type of the screen 10. Furthermore, the same white color projected from the projector 20 may look lighter or darker, depending on the ambient light 80.

In recent years, the projector 20 is increasingly miniaturized and thus is easy for carrying around. For such a reason, a portable projector may frequently be carried to the customer for presentation. However, it is difficult to pre-adjust the color for the environment in the customer. Therefore, the color in the projector will generally manually be adjusted in the front of the customer. This may requires too much time, if projectors perform displaying and measuring calibration images while stepwise changing the gray scale, or input signal value level, for each of the R-, G- and B-colors under the viewing environment.

In this embodiment, projector 20 displays one or several colored calibration images under the viewing environment, with the displayed calibration images being then measured by a sensor 60 including R-, G- and B-color filters. Therefore, the calibration time is shortened by causing the projector 20 to correct the hue and gray scale of the images based on this measurement results.
Functional Blocks Functional blocks in an image processing system of the projector 20 for realizing the aforementioned functions will be described.

Figure 2:
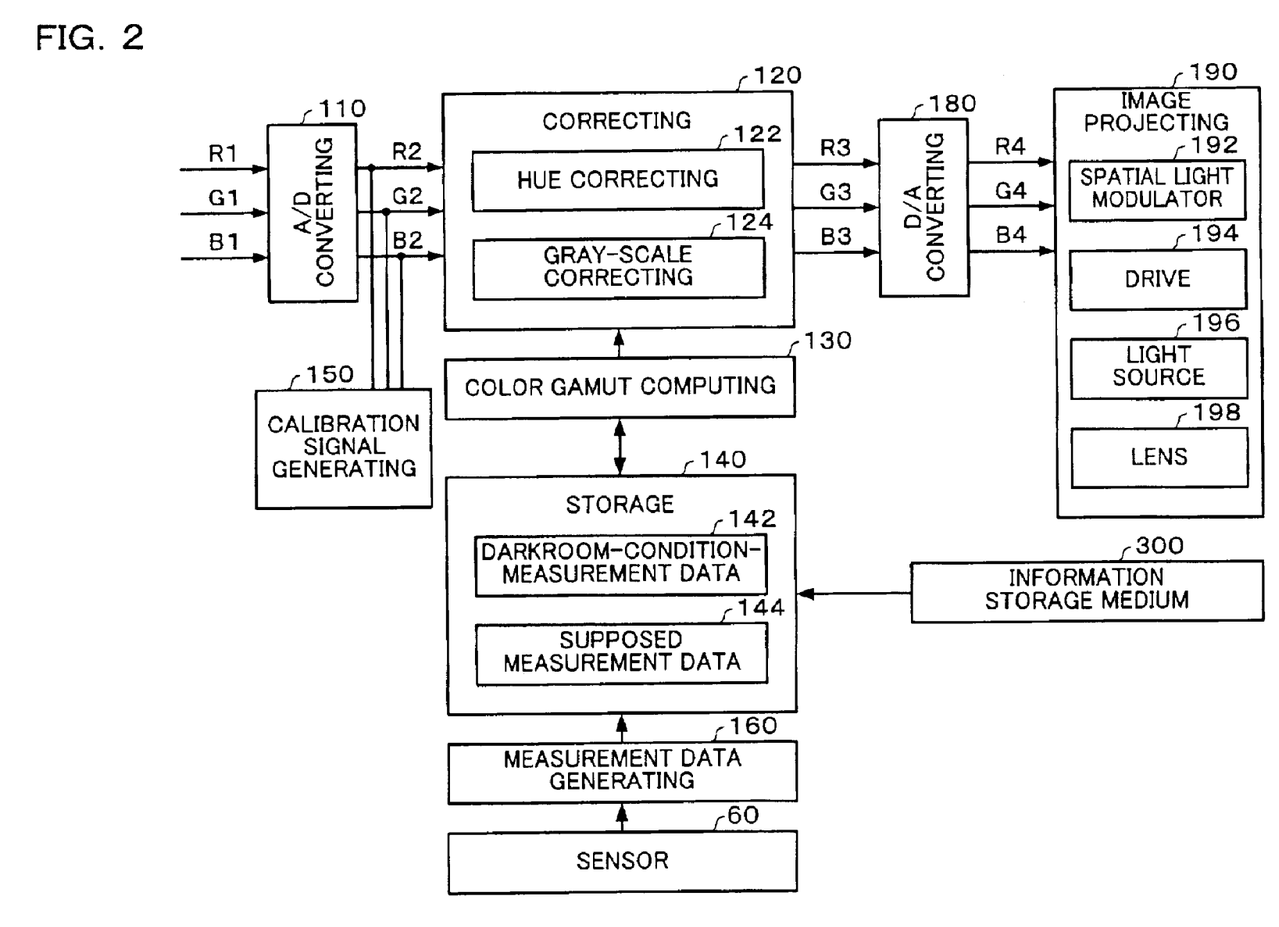
FIG. 2 is a functional block diagram of an image processing system in a projector according to one example of the embodiment.

FIG. 2 is a functional block diagram of an image processing system in the projector 20 according to one example of this embodiment.

The image processing system in the projector 20 comprises an A/D converting section 110, a correcting section 120, a D/A converting section 180, an image projecting section 190, a calibration signal generating section 150, a color gamut computing section 130, a storage section 140 and a measurement data generating section 160.

The A/D converting section 110 converts R1-, G1- and B1-signals constituting analog R-, G- and B-signals which are a kind of input image information from Personal Computer (PC) or the like into digital R2-, G2- and B2-signals.

The calibration signal generating section 150 generates digital R2-, G2- and B2-signals used for display of the calibration image.

In such a manner, the projector 20 can solely perform the calibration without need of the input of calibration signals from any external input device such as PC or the like into the projector 20 since the calibration image signals are generated within the projector 20. The calibration image signals may be inputted from PC or the like directly into the projector 20 without use of the calibration signal generating section 150.

The correcting section 120 corrects image information (R2-, G2- and B2-signals) from the A/D converting section 110 or the calibration signal generating section 150 to form and output R3-, G3- and B3-signals. The correcting section 120 comprises a hue correcting section 122 and a gray-scale correcting section 124.

The D/A converting section 180 converts the R3-, G3- and B3-signals from the correcting section 120 into analog R4-, G4- and B4-signals.

The image projecting section 190, which projects an image based on the image information corrected by the correcting section 120, comprises a spatial light modulator 192, a drive section 194 for driving the spatial light modulator 192 based on the R4-, G4- and B4-signals from the D/A converting section 180, a light source 196 for outputting a light toward the spatial light modulator 192, and a lens 198 for projecting the light modulated by the spatial light modulator 192.

The measurement data generating section 160 causes the storage section 140 to store data measured by a sensor 60 under a darkroom condition as darkroom-condition-measurement data 142 which can be numerically represented for each of R-, G-and B-colors depending on the output from each of the R-, G- and B-color filters. At the same time, the measurement data generating section 160 causes the storage section 140 to store data measured by the sensor 60 under the viewing environment as supposed measurement data 144 which can numerically be represented for each of the R-, G- and B-colors depending on the output from each of the R-, G- and B-color filters.

The darkroom-condition-measurement data 142 maybe in the form of a so-called device profile.

The color gamut computing section 130 computes the area ratio between a color gamut based on the darkroom-condition-measurement data 142 under the darkroom condition and another color gamut based on the supposed measurement data 144 under the viewing environment.

The correcting section 120 corrects an image correcting data (e.g., three-dimensional hue correcting lookup table, hue correcting matrix or one-dimensional gray-scale correcting lookup table) to correct the hue and gray scale of an image using a logistic function with a parameter based on the computed area ratio.

Flow of Image Processing

A flow of image processing with the use of these sections and portions will be explained in connection with a flow chart.

Figure 3:
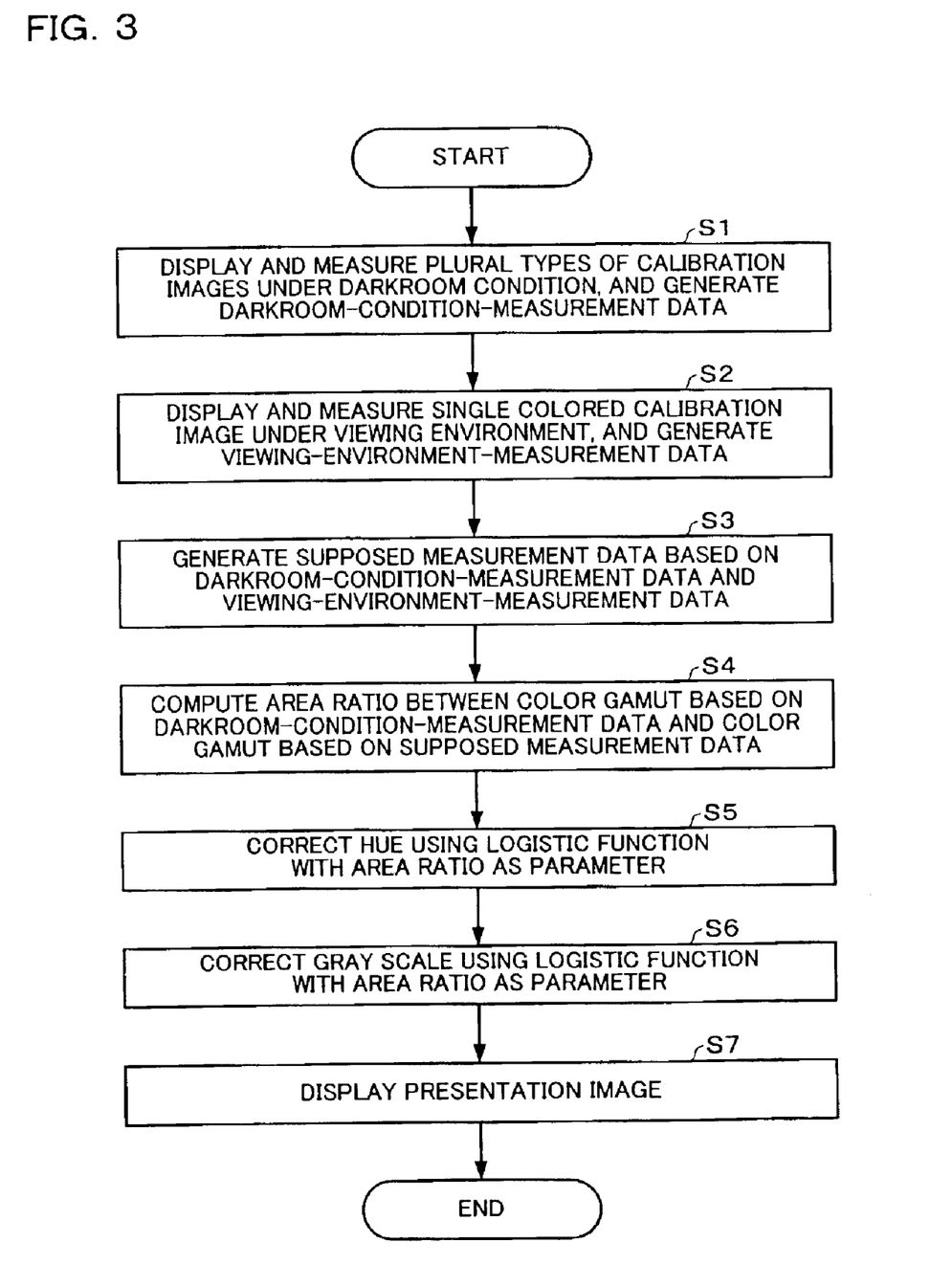
FIG. 3 is a flow chart illustrating a procedure of image processing according to one example of the embodiment.

FIG. 3 is a flow chart illustrating an image processing procedure according to one example of this embodiment.

First of all, the projector 20 performs displaying and measuring a plurality of calibration images under the darkroom condition, and generates the darkroom-condition-measurement data 142 (step S1).

More particularly, the calibration signal generating section 150 sequentially outputs the calibration signals (R2, G2, B2) so that a plurality of single-colored, or black(K)-, red(R)-, gray(G)-, blue(B)- and white(W)-colored calibration images will sequentially be displayed.

The sensor 60 measures the image display region 12 each time when each calibration image is projected onto the screen 10 by means of the image projecting section 190.

On the measurement, the sensor 60 converts a voltage value for each of the R-, G- and B-color filters included therein into a digital data which is in turn outputted toward the measurement data generating section 160.

The measurement data generating section 160 generates the darkroom-condition-measurement data 142 indicating the numerical value for each of the R-, G- and B-color filters in relation to each calibration image, the generated darkroom-condition-measurement data 142 being in turn stored in the storage section 140.

Figure 4A:
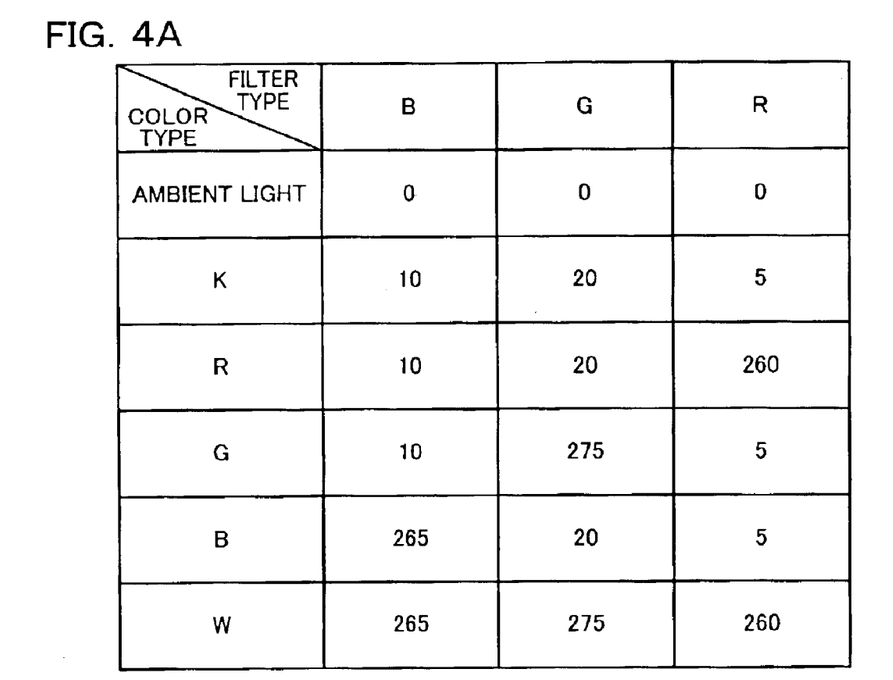
FIG. 4A is a diagrammatic view illustrating the data structure of the darkroom-condition-measurement data.

FIG. 4A is a diagrammatic view illustrating the data structure of the darkroom-condition-measurement data 142.

For example, the example shown in FIG. 4A may have the value of blue (B) equal to 265, the value of green (G) equal to 275 and the value of red (R) equal to 260 when a white-colored calibration image is measured under the darkroom condition. Because there is not influence of the ambient light 80 under the darkroom condition, the measurement of the ambient light is zero.

The darkroom-condition-measurement data 142 is generally stored in the projector 20 at the stage of production of the projector 20.

After the darkroom-condition-measurement data 142 has been stored in the storage section 140, the projector 20 performs displaying and measuring a single-colored calibration image, and generates viewing-environment-measurement data under the viewing environment in which the presentation is actually carried out (step S2).

More particularly, the projector 20 projects the white-colored monochromatic calibration image while the sensor 60 measures that calibration image displayed on the image display region 12.

The measurement data generating section 160 generates the viewing-environment-measurement data which can numerically be represented for each of the R-, G- and B-color filters, based on the measurement result from the sensor 60.

After the viewing-environment-measurement data has been generated, the measurement data generating section 160 generates supposed measurement data 144 having the same data structure as the darkroom-condition-measurement data 142, based on the viewing-environment-measurement data and darkroom-condition-measurement data 142 (step S3).

Figure 4B:
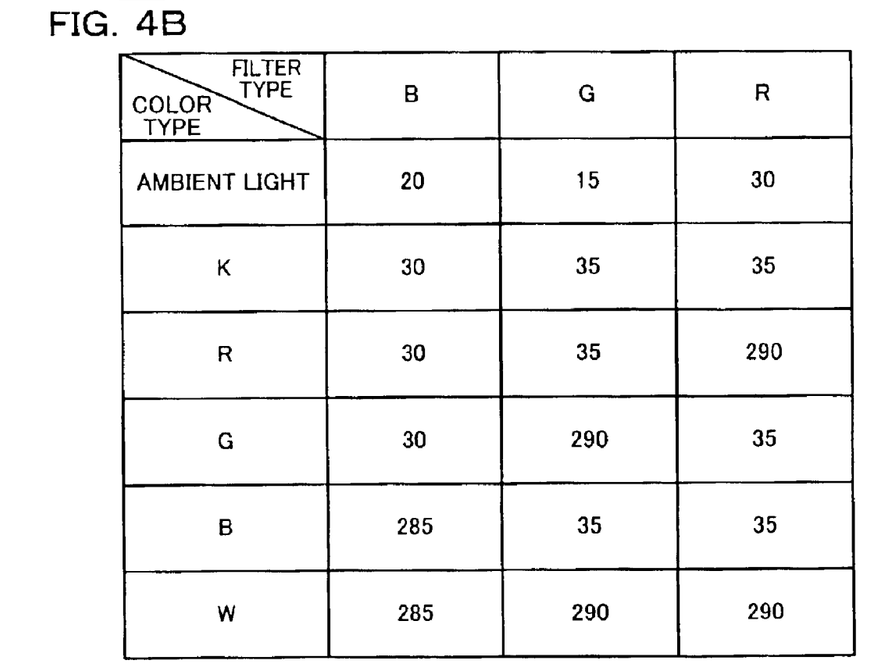
FIG. 4B is a diagrammatic view illustrating the data structure of the supposed measurement data.

FIG. 4B is a diagrammatic view illustrating the data structure of the supposed measurement data 144.

It is supposed herein that the respective values of B, G and R of the viewing-environment-measurement data when the white-colored calibration image is measured under the viewing environment are equal to 285, 290 and 290.

In this case, the measurement data generating section 160 can suppose that the measured values only for the ambient light 80 are equal to 20, 15 and 30 by subtracting the values 265, 275 and 260 of W measured under the darkroom condition as shown in FIG. 4A from the value of the viewing-environment-measurement data.

The measurement data generating section 160 can generate and store the supposed measurement data 144 shown in FIG. 4B in the storage section 140 by adding these values of the ambient light 80 to values other than those of W shown in FIG. 4A. More particularly, for K, for example, it can be supposed that the values of K under the darkroom condition are equal to 30, 35 and 35 by adding 20, 15 and 30, that is, the measured values only for the ambient light 80 to 10, 20 and 5, that is, the measured values of K under the viewing environment.

After the supposed measurement data 144 has been generated, the color gamut computing section 130 computes the area ratio between a color gamut based on the supposed measurement data 144 and another color gamut based on the darkroom-condition-measurement data 142 (step S4).

Figure 5:
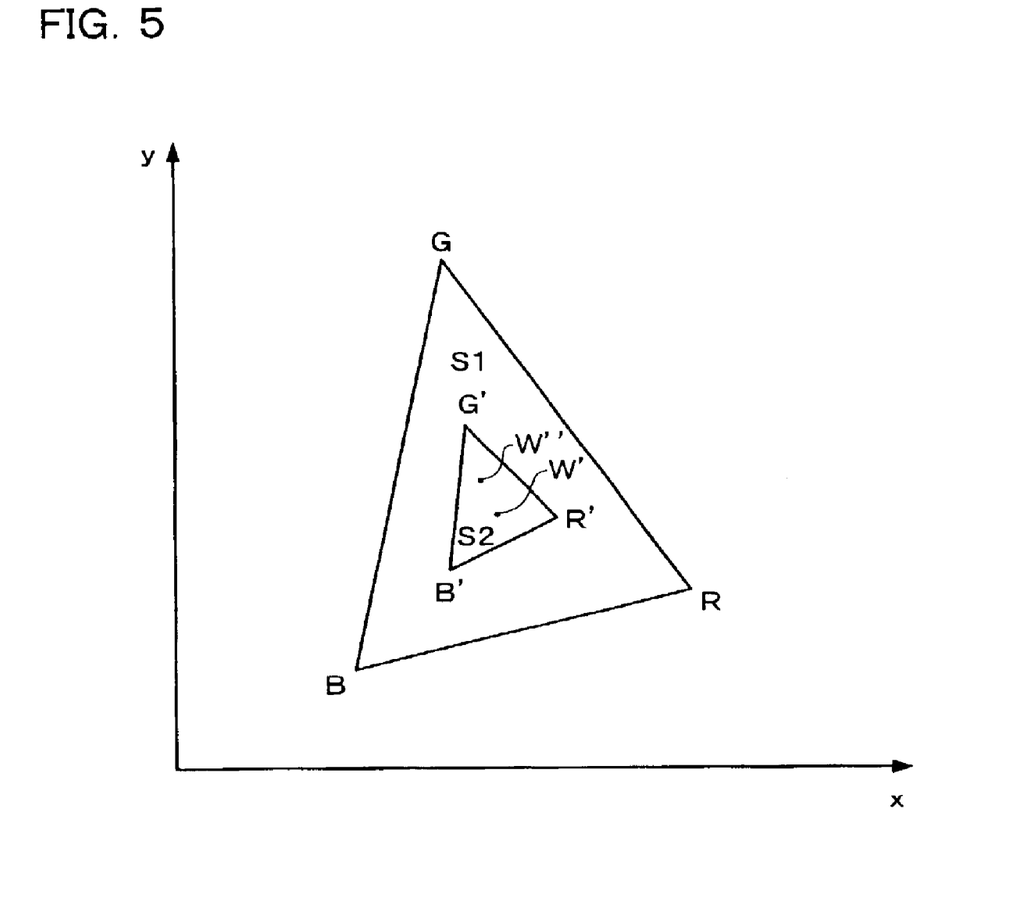
FIG. 5 is a diagrammatic view illustrating one example of a color gamut in a projector under a viewing environment and darkroom condition.

FIG. 5 is a diagrammatic view illustrating a color gamut in the projector under the viewing environment and darkroom condition.

It is assumed, or example, that the color gamut of the projector 20 under the darkroom condition has a triangle RGB having its area S1 in the x-y chromaticity diagram and that the color gamut of the projector 20 under the viewing environment has a triangle R'G'B' having its area S2 in the x-y chromaticity diagram.

In general, the area S1 of the color gamut under the darkroom condition is larger than the area S2 of the color gamut under the viewing environment. This is because the color gamut will be reduced under influence of the ambient light 80 under the viewing environment. In other words, the area S2 of the color gamut under the viewing environment will represent the influence of the ambient light 80.

The hue correcting section 122 corrects the hue of an image using a logistic function with a parameter which is the area ratio (S2/S1) (step S5).

More particularly, the hue correcting section 122 corrects the color gamut R'G'B' under the viewing environment for the purpose of providing a color gamut in which the hue of a target image is reproduced.

For this correction, the hue correcting section 122 determines a displacement ΔW in the x-y chromaticity diagram between a white-colored point W" in the color gamut and another white-colored point W' in the color gamut R'G'B' under the viewing environment.

The displacement ΔW includes an x-axial displacement ΔWx and a y-axis displacement ΔWy. It is also assumed that ((S2/S1)−1)*10 is α; an adjusting parameter which will be described later is h; the x and y values of a white color under the viewing environment are Wxs and Wys, respectively; the x and y values of a target white color are Wxt and Wyt, respectively; and the x and y values of a white color having the same hue as in the target white color are Wx" and Wy", respectively.

In this case, for the x-axis direction, ΔWx=(h−(1+EXP(−α))−1)*(Wxs−Wxt); if wxs−wxt is larger than zero, Wx"=Wxs+ΔWx; and if Wxs−Wxt is equal to or smaller than zero, Wx"=Wxs+ΔWx.

Similarly, for the y-axis direction, ΔWy=(h−(1+EXP(−α))−1)*(Wys−Wyt); if Wys−Wyt is larger than zero, Wy"=Wys−ΔWy; and if Wys−Wyt is equal to or smaller than zero, Wy"=Wys+Δwy.

Therefore, the coordinates of the white colored point W" in the color gamut in which the hue of the target image is to be reproduced are (Wx", Wy")in the x-y chromaticity diagram.

EXP is a function that returns the numerical exponentiation having its base which is a natural number e. Moreover, "$(1+EXP(-\alpha))^{-1}$" is a so-called logistic function.

In such a manner, the displacement ΔW can also be determined from the coordinates of W" minus the coordinates of W', if the coordinates of the white-colored point W" has been determined. The color gamut in which the hue of the target image is to be reproduced can be determined by shifting the color gamut under the viewing environment by ΔW.

The relationship between the value of α and the ΔW will be described below.

It is assumed herein that a displacement for reproducing the same color appearance as in the hue of the aforementioned target color is ΔW and that a displacement between the coordinates of W measured under the viewing environment and the coordinates of the target W is ΔWS. In this case, the relationship between the value of a and the ratio ΔW/ΔWS of the displacement is as shown in FIG. 6.

Figure 6:
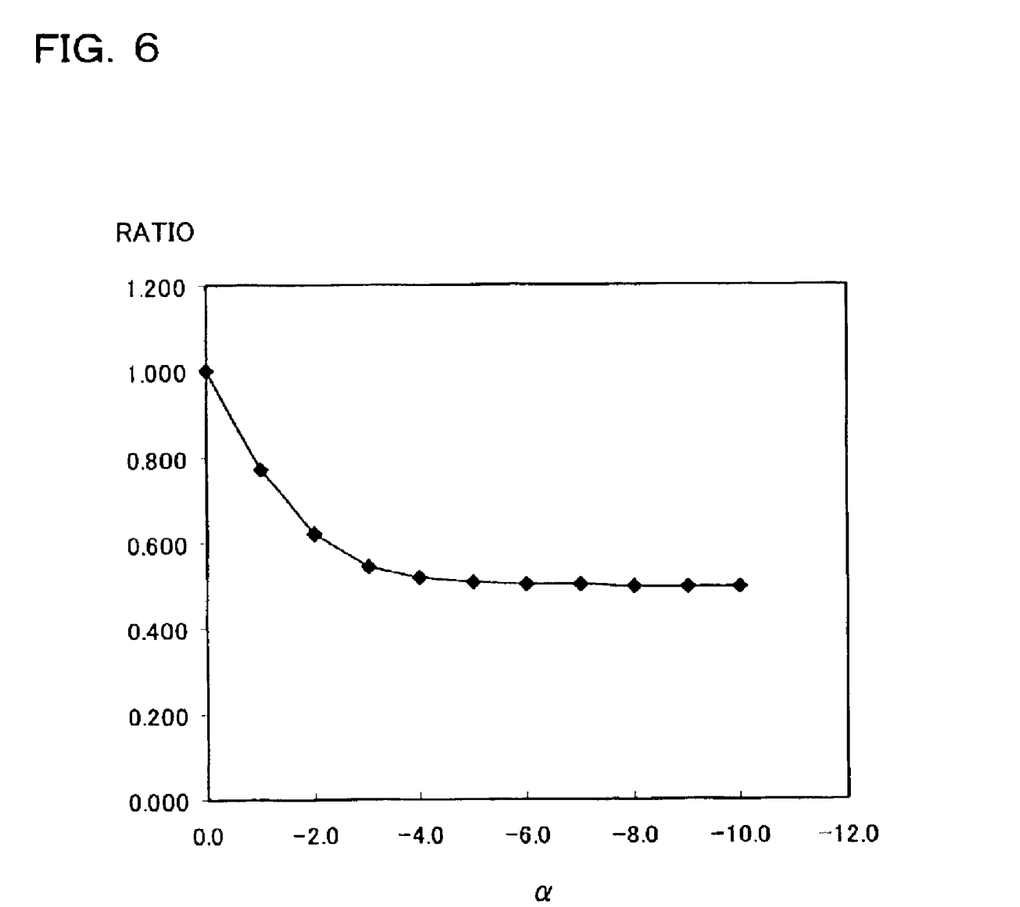
FIG. 6 is a view illustrating the relationship between a and ratio in one example of the embodiment.

FIG. 6 is a view illustrating the relationship between a and ratio according one example of this embodiment.

As described, α is ((S2/S1)−1)*10. The color gamut S1 in the ideal environment is fixed, but the color gamut S2 in the viewing environment becomes smaller as the influence of the ambient light 80 increases. Therefore, with no influence of the ambient light 80, α=0: the value of α becomes smaller as the influence of the ambient light 80 increases.

On the contrary, the ratio is 1 in the event of α=0: the ratio converges to 0.5 as the value of a becomes smaller, as shown in FIG. 6.

This means that when a becomes smaller, namely, when the influence of the ambient light 80 increases, the change of the value ΔW becomes smaller than that of the value ΔWS.

In general, the change of brightness and/or color actually felt by the human beings is smaller than the change of measured value since the human eyes accommodate to the change of brightness and/or color.

Therefore, the color can appropriately be corrected for color accommodation by using the aforementioned logistic function.

The gray-scale correcting section 124 corrects the gray scale of an image using the logistic function having a parameter of the area ratio (S2/S1) (step S6).

It is now assumed that the correction of gamma value is Δγ; the corrected gamma value is γ'; the minimum gamma value for providing the accurate computation is γmin; and a parameter for adjusting to be Δγ=0 at α=0 is h.

In this case, $$\Delta\gamma = -h\ (\gamma - \gamma min) + (1 + EXP(-\alpha))^{-1}, \text{ and}$$

$$\gamma' = \gamma + \Delta\gamma.$$

In such a manner, the logistic function is used to perform the correction even for gray level.

Figure 7:
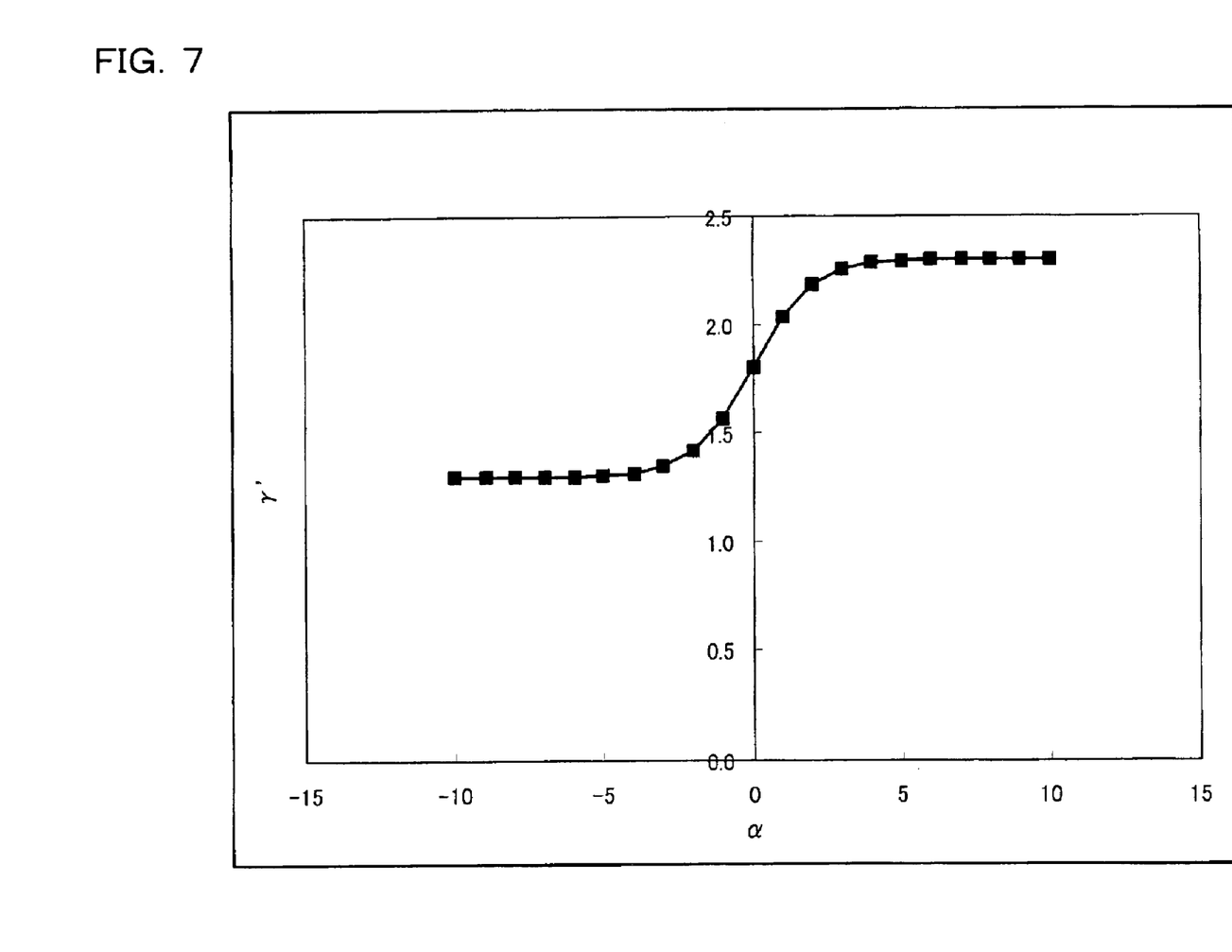
FIG. 7 is a view illustrating the change of γ' relative to a in one example of the embodiment.

FIG. 7 is a view illustrating the change of γ' relative to α in one example of this embodiment.

There will be described a case where a default (initial) gamma value is 1.8 and the minimum gamma value is 0.3.

In this case, if the value of α is −2, that is, when the viewing environment is lighter than the normal level, for example, the value of Δγ is −0.38 and the value of γ' is 1.42. In other words, the gamma value decreases when the viewing environment is brighter under influence of the illuminating light or the like.

If the value of α is 10, that is, when the viewing environment is darker than the normal level, for example, the value of Δγ is 0.5 and the value of γ' is 2.3. In other words, the gamma value increases when the viewing environment is darker under influence of the illuminating light or the like.

The projector 20 measures a single-colored calibration image under the viewing environment and then projects a presentation image which has been corrected for hue and gray scale (step S7).

According to this embodiment, as described, the projector 20 can correct the hue and gray scale of an image accommodating with the viewing environment merely by using the single-colored calibration image under the viewing environment.

Thus, the projector 20 can shorten time required for calibration in comparison with the prior art.

In particular, the projector 20 can display the image more adequately reflected by the human's sense of brightness by performing the correction through the logistic function. This is because the logistic function is most used for estimation of the image quality as a deterioration addition model for determining the relationship between the evaluation standard of the human beings and the physical quantity.

Furthermore, the projector 20 can reduce time required to perform the correction in consideration with the adapting intergradation by correcting the hue and gray scale, based on the ratio between the area of the color gamut under the ideal environment and the area of the color gamut under the viewing environment. This is because the adapting intergradation is highly influenced by the illuminating light or the like and thus provides the area of the above-mentioned color gamut influenced by the illuminating light or the like. Thus, the area of the above-mentioned color gamut can be computed for a reduced time period. Such a computation may in turn provide the results reflected by the adapting intergradation in a mimetic manner.

Hardware

The following things can be applied to the respective hardware parts above mentioned.

Figure 8:
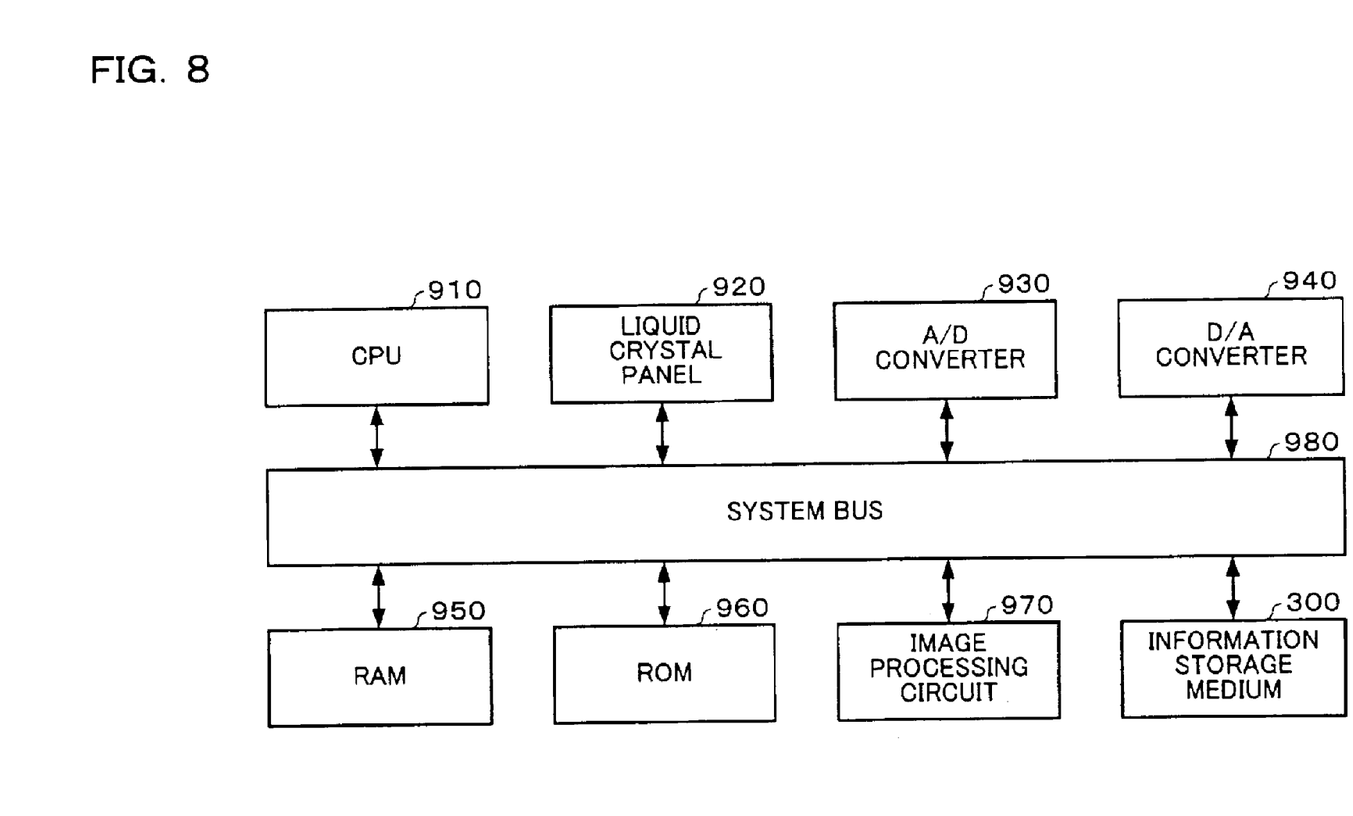
FIG. 8 is a hardware block diagram of the image processing system in the projector according to one example of the embodiment.

FIG. 8 is a hardware block diagram of the image processing system in the projector 20 according to one example of this embodiment.

The A/D converting section 110 may be realized, for example, by an A/D converter 910 or the like; the D/A converting section 180 may be realized, for example, by a D/A converter 940 or the like; the spatial light modulator 192 maybe realized, for example, by a liquid crystal panel 920 and liquid crystal light valve or the like; the drive section 194 may be realized, for example, by a ROM 960 in which a liquid crystal light valve driver has been stored, or the like; the correcting section 120, color gamut computing section 130 and measurement data generating section 160 maybe realized, for example, by an image processing circuit 970, CPU 910, RAM 950, or the like; the storage section 140 may be realized, for example, by an RAM 950 or the like; and the sensor 60 may be realized, for example, by an RGB sensor or a luminous efficacy sensor or the like. These sections can exchange information with each other through a system bus 980. These sections may be realized in a hardware manner or in a software manner such as drivers.

A computer included in the projector 20 may realize the functions of these sections according to a program which is read out of the information storage medium 300.

The information storage medium 300 may be formed by any one of various components such as CD-ROM, DVD-ROM, ROM, RAM, and HDD while the information reading mode thereof may be either of the contact or non-contact type.

In addition, the above-mentioned functions may be realized according to a program downloaded from a host device or the like through a transmission channel, rather than from the information storage medium 300.

Modified Examples

Although the preferred embodiment of the present invention has been described, the present invention is not limited to the aforementioned examples.

For example, the calibration image used under the viewing environment may be colored, for example, by blue, green, red or others rather than white or by the combination of two or more colors among these colors.

In the aforementioned examples, the sensor 60 is in the form of RGB sensor, but may be any one of various sensors other than the RGB sensor if it can output a value for generating the color gamut in the x-y chromaticity diagram. Such a sensor may be in the form of a luminous efficacy sensor or a sensor which can output X-, Y- and Z-values (X-, Y- and Z-values themselves or values that can be converted into X-, Y- and Z-values).

The X-, Y- and Z-values used herein are device independent colors which are based on the International Standard defined by the International Commission on Illumination (CIE). The X-, Y- and Z-values can be converted into R-, G- and B-values, respectively. The value of Y can directly indicate the brightness.

The image processing system according to this embodiment may be applied to, for example, Cathode Ray Tube (CRT), Plasma Display Panel (PDP), Field Emission Display (FED), Electro Luminescence (EL), a display section such as a direct viewing type liquid crystal display, a projector using Digital Micromirror Device (DMD), rather than such a liquid crystal projector 20 as described. For DMD, the spatial light modulator 192 may be formed by the combination of a color filter with a DMD chip. DMD is a trademark possessed by the Texas Instruments Incorporated of the U.S. Furthermore, the projector is not limited to be of front projection type, but it may be of back projection type.

In addition, the present invention can effectively be used in meeting, medical care, design and fashion, business activity, commercial, education as well as any general image display such as movie, TV, video and game, in addition to the presentation.

In addition, the function of the aforementioned projector 20 may be realized by a single image display device (e.g., projector 20) or may be accomplished by a plurality of distributed processing units (e.g., the projector 20 and personal computers) furthermore, the projector 20 may be integrated with the sensor 60 or the projector 20 may be configured separately from the sensor 60.

What is claimed is:

1. An image processing system comprising:
a storage section which stores darkroom-condition-measurement data obtained by measuring a display region on which a plurality of calibration images are sequentially displayed under a darkroom condition, each of the plurality of calibration images having a different color, the display region being measured for each of the plurality of calibration images through a sensor;
a supposed measurement data generating section which generates supposed measurement data based on viewing-environment-measurement data and the darkroom-condition-measurement data, the viewing-environment-measurement data being obtained by measuring the display region on which one of the plurality of calibration images is displayed under a viewing environment through the sensor; and
a correcting section which corrects predetermined image correcting data by grasping a difference between the darkroom condition and the viewing environment based on the darkroom-condition-measurement data and the supposed measurement data, and also corrects image information used for image display based on the corrected image correcting data.

2. The image processing system as defined in claim 1, further comprising:
a color gamut computing section which computes an area ratio between a color gamut based on the darkroom-condition-measurement data and a color gamut based on the supposed measurement data,
wherein the correcting section corrects the image correcting data to correct a hue and gray scale of an image using a logistic function with a parameter based on the area ratio, and also corrects the image information based on the corrected image correcting data.

3. The image processing system as defined in claim 2, wherein the supposed measurement data is obtained by supposing a measurement value expected to be obtained in a case of measuring the display region on which another of the plurality of calibration images is displayed under the viewing environment through the sensor.

4. The image processing system as defined in claim 3, wherein the supposed measurement data generating section generates the supposed measurement data based on viewing-environment-measurement data obtained by measuring calibration images through the sensor, each of the calibration images having a different color, the calibration images being smaller in number than the plurality of calibration images.

5. A projector comprising:
a storage section which stores darkroom-condition-measurement data obtained by measuring a display region on which a plurality of calibration images are sequentially displayed under a darkroom condition, each of the plurality of calibration images having a different color, the display region being measured for each of the plurality of calibration images through a sensor;
a supposed measurement data generating section which generates supposed measurement data based on viewing-environment-measurement data and the darkroom-condition-measurement data, the viewing-environment-measurement data being obtained by measuring the display region on which one of the plurality of calibration images is displayed under a viewing environment through the sensor;
a correcting section which corrects predetermined image correcting data by grasping a difference between the darkroom condition and the viewing environment based on the darkroom-condition-measurement data and the supposed measurement data, and also corrects image information used for image display based on the corrected image correcting data; and an image projecting section which projects an image based on the corrected image information.

6. A computer-readable program for causing a computer to function as:

storage means for storing darkroom-condition-measurement data obtained by measuring a display region on which a plurality of calibration images are sequentially displayed under a darkroom condition, each of the plurality of calibration images having a different color, the display region being measured for each of the plurality of calibration images through a sensor;

supposed measurement data generating means for generating supposed measurement data based on viewing-environment-measurement data and the darkroom-condition-measurement data, the viewing-environment-measurement data being obtained by measuring the display region on which one of the plurality of calibration images is displayed under a viewing environment through the sensor; and correcting means for correcting predetermined image correcting data by grasping a difference between the darkroom condition and the viewing environment based on the darkroom-condition-measurement data and the supposed measurement data, and also corrects image information used for image display based on the corrected image correcting data.

7. The program as defined in claim 6, the program causing a computer to function as:

color gamut computing means for computing an area ratio between a color gamut based on the darkroom-condition-measurement data and a color gamut based on the supposed measurement data, wherein the correcting means corrects the image correcting data to correct a hue and gray scale of an image using a logistic function with a parameter based on the area ratio, and also corrects the image information based on the corrected image correcting data.

8. The program as defined in claim 7, wherein the supposed measurement data is obtained by supposing a measurement value expected to be obtained in a case of measuring the display region on which another of the plurality of calibration images is displayed under the viewing environment through the sensor.

9. The program as defined in claim 8, wherein the supposed measurement data generating means generates the supposed measurement data based on viewing-environment-measurement data obtained by measuring calibration images through the sensor, each of the calibration images having a different color, the calibration images being smaller in number than the plurality of calibration images.

10. An information storage medium storing a computer-readable program for causing a computer to function as:

storage means for storing darkroom-condition-measurement data obtained by measuring a display region on which a plurality of calibration images are sequentially displayed under a darkroom condition, each of the plurality of calibration images having a different color, the display region being measured for each of the plurality of calibration images through a sensor;

supposed measurement data generating means for generating supposed measurement data based on viewing-environment-measurement data and the darkroom-condition-measurement data, the viewing-environment-measurement data being obtained by measuring the display region on which one of the plurality of calibration images is displayed under a viewing environment through the sensor; and correcting means for correcting predetermined image correcting data by grasping a difference between the darkroom condition and the viewing environment based on the darkroom-condition-measurement data and the supposed measurement data, and also corrects image information used for image display based on the corrected image correcting data.

11. An image processing method comprising steps of:

displaying a plurality of calibration images under a darkroom condition, each of the plurality of calibration images having a different color;

measuring each of the plurality of calibration images through a sensor, the plurality of calibration images being sequentially displayed;

generating darkroom-condition-measurement data based on the measuring of each of the plurality of calibration images;

displaying one of the plurality of calibration images under a viewing environment;

measuring the displayed one of the plurality of calibration images through the sensor;

generating viewing-environment-measurement data based on the measuring of the displayed one of the plurality of calibration images;

generating supposed measurement data based on the viewing-environment-measurement data and the darkroom-condition-measurement data;

correcting a predetermined image correcting data by grasping a difference between the darkroom condition and the viewing environment based on the darkroom-condition-measurement data and the supposed measurement data;

correcting image information based on the corrected image correcting data; and displaying an image based on the corrected image information.

12. The image processing method as defined in claim 11, wherein, when the image correcting data is corrected, an area ratio between a color gamut based on the darkroom-condition-measurement data and a color gamut based on the supposed measurement data is computed, and wherein the image correcting data is corrected to correct a hue and gray scale of an image using a logistic function with a parameter based on the area ratio.

13. The image processing method as defined in claim 12, wherein the supposed measurement data is obtained by supposing a measurement value expected to be obtained in a case of measuring the display region on which another of the plurality of calibration images is displayed under the viewing environment through the sensor.

14. The image processing method as defined in claim 13, further comprising steps of:

displaying calibration images under the viewing environment, each of the calibration images having a different color, the calibration images being smaller in number than the plurality of calibration images;

measuring the calibration images through the sensor; and generating the viewing-environment-measurement data based on the measuring of the calibration images.

* * * * *